(12) United States Patent
Ley

(10) Patent No.: US 9,151,337 B2
(45) Date of Patent: Oct. 6, 2015

(54) SELF-ADJUSTING MECHANISM FOR A FRICTION CLUTCH

(71) Applicant: Ace Manufacturing & Parts Company, Sullivan, MO (US)

(72) Inventor: Brian Robert Ley, Washington, MO (US)

(73) Assignee: Ace Manufacturing & Parts Company, Sullivan, MO (US)

( * ) Notice: Subject to any disclaimer, the term of this patent is extended or adjusted under 35 U.S.C. 154(b) by 0 days.

(21) Appl. No.: 14/033,828

(22) Filed: Sep. 23, 2013

(65) Prior Publication Data

US 2015/0083544 A1 Mar. 26, 2015

(51) Int. Cl.
*F16D 13/75* (2006.01)
*F16D 13/38* (2006.01)

(52) U.S. Cl.
CPC ............ *F16D 13/757* (2013.01); *F16D 13/385* (2013.01); *F16D 13/75* (2013.01)

(58) Field of Classification Search
USPC ...................................................... 192/111.17
See application file for complete search history.

(56) References Cited

U.S. PATENT DOCUMENTS

| 3,752,286 | A | * | 8/1973 | Sink ......................... | 192/70.252 |
| 4,228,883 | A | * | 10/1980 | Palmer ..................... | 192/70.252 |
| 5,029,687 | A | * | 7/1991 | Asada et al. ............. | 192/70.252 |
| 5,090,536 | A | * | 2/1992 | Asada ...................... | 192/70.252 |
| 5,251,737 | A | | 10/1993 | Flotow et al. | |
| 6,062,365 | A | * | 5/2000 | Gochenour ............. | 192/70.252 |
| 8,733,525 | B2 | * | 5/2014 | Raber et al. ............. | 192/70.252 |
| 2007/0012529 | A1 | * | 1/2007 | Kreidler et al. .......... | 188/196 R |

* cited by examiner

*Primary Examiner* — Ramya Burgess
*Assistant Examiner* — Mark Manley
(74) *Attorney, Agent, or Firm* — Senniger Powers LLP

(57) ABSTRACT

A self-adjusting mechanism for a friction clutch is disclosed. The mechanism includes first and second hub members with mating ratchet teeth, and an adjustment arm having a non-slip connection with the first hub member for driving the first hub member in opposite rotational directions, and a worm gear which, when rotated, moves an adjustment ring of the clutch to adjust the friction surfaces to compensate for wear. The mechanism also includes a lost-motion connection located between the worm gear and the release mechanism of the clutch. The adjustment arm on the first hub member has a connection with the release mechanism of the clutch. The release mechanism is movable through an adjustment cycle during which the worm gear is rotated to move the adjustment ring of the clutch to adjust friction surfaces to compensate for wear.

17 Claims, 15 Drawing Sheets

(Clutch Engaged)

(Clutch Disengaged)

SELF-ADJUSTING MECHANISM FOR A FRICTION CLUTCH

FIELD OF THE INVENTION

The present invention generally relates to friction clutches, and more particularly to a self-adjusting mechanism which automatically compensates for the wear of friction components of the clutch.

BACKGROUND OF THE INVENTION

Self-adjusting devices that automatically compensate for the wear of friction surfaces of spring-loaded clutches are known in the art. Exemplary devices are disclosed in U.S. Pat. Nos. 3,752,286 and 5,251,737. However, such devices use wire spring components that have the potential to slip and/or require resetting after an adjustment occurs.

SUMMARY OF THE INVENTION

A self-adjusting mechanism for a friction clutch of this invention represents an improvement over conventional devices. The mechanism is useful in a friction clutch of the type having a cover, a pressure plate movable relative to the cover to cause friction members of the clutch to move into engagement, a clutch release mechanism movable toward and away from the pressure plate, and an adjustment ring rotatable to compensate for wear of the friction members. The self-adjusting mechanism of this invention comprises a mounting bracket adapted to be secured to the cover of the clutch, first and second rotatable hub members supported for rotation by the bracket, and mating ratchet teeth on the first and second hub members configured such that the first hub member can rotate in a first rotational direction relative to the second hub member but can engage and drive the second hub member in a second rotational direction opposite the first rotational direction when the first hub member rotates in the second rotational direction. An adjustment arm on the first hub member is provided for affecting rotation of the first hub member in first and second rotational directions. The mechanism also includes a worm gear supported for rotation by the bracket, and an anti-slip device configured to hold the worm gear against rotation in the first rotational direction but to allow rotation of the worm gear in the second rotational direction. A lost-motion connection between the worm gear and one of the adjustment arm, first hub member, and second hub member permits a limited range of rotational free play. The clutch release mechanism is movable through an adjustment cycle in which the release mechanism moves in said first axial direction and drives the adjustment arm to rotate the first hub member in said first rotational direction through an adjustment angle of rotation sufficient to cause separation of said mating teeth to permit movement of the first hub member relative to the second hub member. The release mechanism then moves in said second axial direction and drives the adjustment arm to rotate the first and second hub members in said second rotational direction back through said adjustment angle of rotation, said lost-motion connection being configured such that rotation of the second hub member back through said adjustment angle of rotation causes rotation of the worm gear to affect rotation of the adjustment ring to compensate for wear of the friction members.

In another embodiment, the self-adjusting mechanism comprises a mounting bracket adapted to be secured to the cover of the clutch, first and second rotatable hub members supported for rotation by the bracket, and mating ratchet teeth on the first and second hub members configured such that the first hub member can rotate in a first rotational direction relative to the second hub member but can engage and drive the second hub member in a second rotational direction opposite the first rotational direction when the first hub member rotates in the second rotational direction. An adjustment arm has a non-slip connection with the first hub member for affecting rotation of the first hub member in first and second rotational directions without substantial rotational slippage of the adjustment arm relative to the first hub member. The mechanism also includes a worm gear supported for rotation by the bracket, and an anti-slip device configured to hold the worm gear against rotation in the first rotational direction but to allow rotation of the worm gear in the second rotational direction. A connection between the adjustment arm and the clutch release mechanism is such that movement of the clutch release mechanism in a first axial direction causes movement of the adjustment arm in the first rotational direction, and movement of the clutch release mechanism in a second axial direction opposite the first axial direction causes movement of the adjustment arm in the second rotational direction. The clutch release mechanism is movable through a non-adjustment cycle wherein the release mechanism moves in said first axial direction and drives the adjustment arm to rotate the first and second hub members in said first rotational direction through a non-adjustment angle of rotation without rotating the worm gear. The release mechanism then moves in said second axial direction and drives the adjustment arm to rotate the first and second hub members in said second rotational direction back through the non-adjustment angle of rotation without rotating the worm gear. The clutch release mechanism is also movable through an adjustment cycle wherein the release mechanism moves in said first axial direction and drives the adjustment arm to rotate the first hub member in said first rotational direction through an adjustment angle of rotation greater than the non-adjustment angle of rotation by a delta angle of rotation, said mating teeth separating during said delta angle of rotation to permit movement of the first hub member relative to the second hub member. The release mechanism then moves in said second axial direction and drives the adjustment arm to rotate the first and second hub members in said second rotational direction back through said adjustment angle of rotation. The lost-motion connection is configured such that rotation of the second hub member back through said adjustment angle of rotation causes rotation of the worm gear to affect rotation of the adjustment ring to compensate for wear of the friction members.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
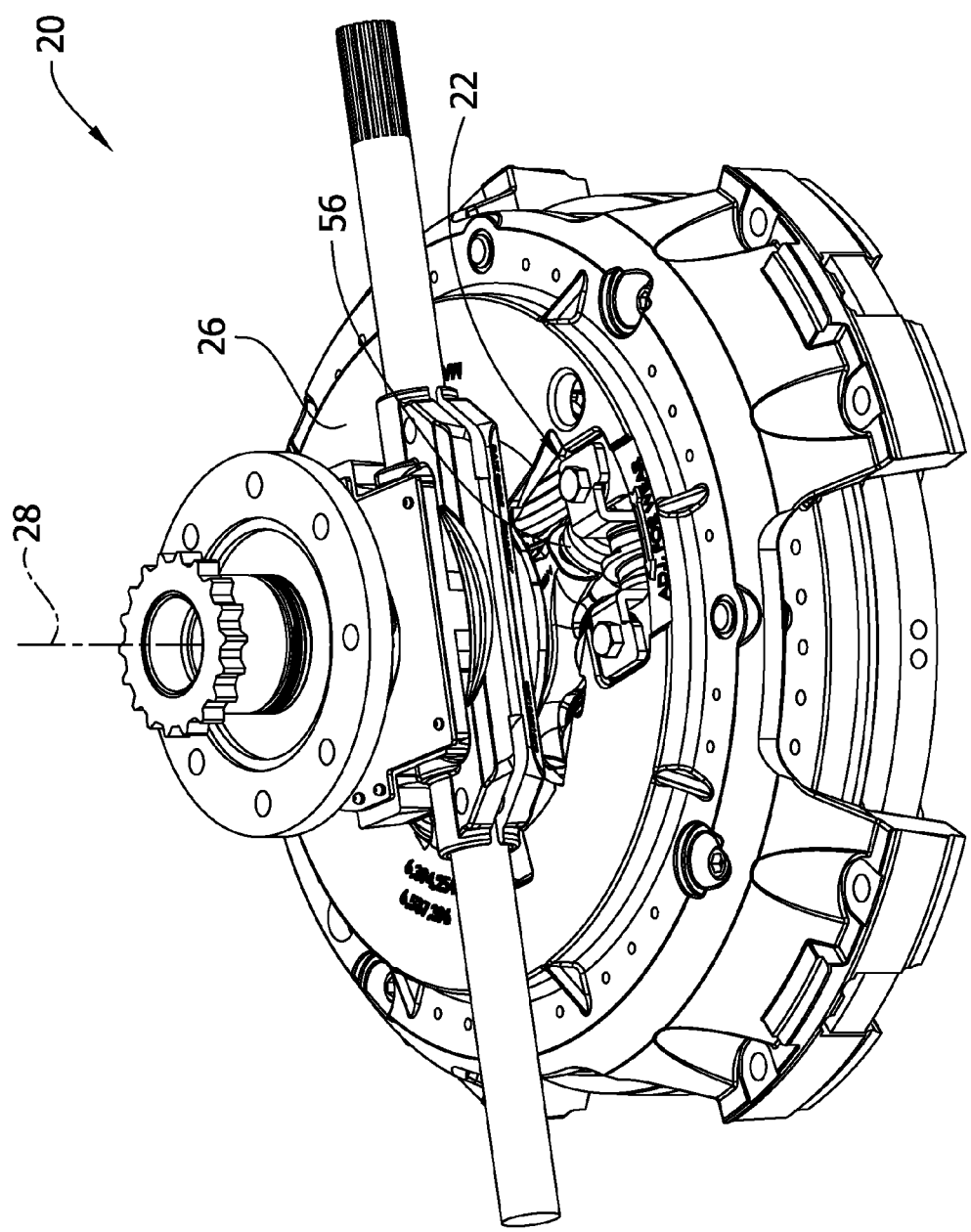
FIG. 1 is a perspective of a friction clutch incorporating one embodiment of a self-adjusting mechanism of the present invention.
Figure 2:
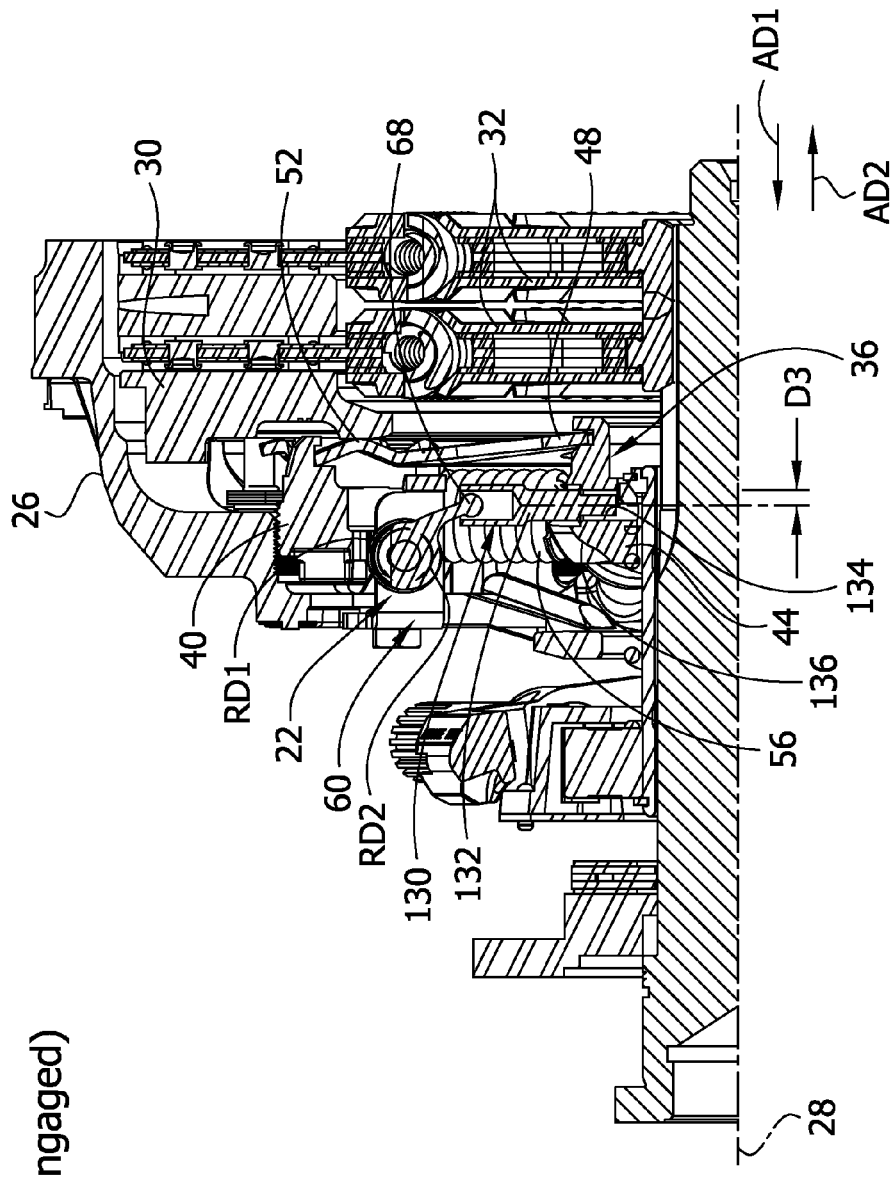
FIG. 2 is a cross-sectional view of the clutch of FIG. 1 showing the clutch in an engaged position.
Figure 3:
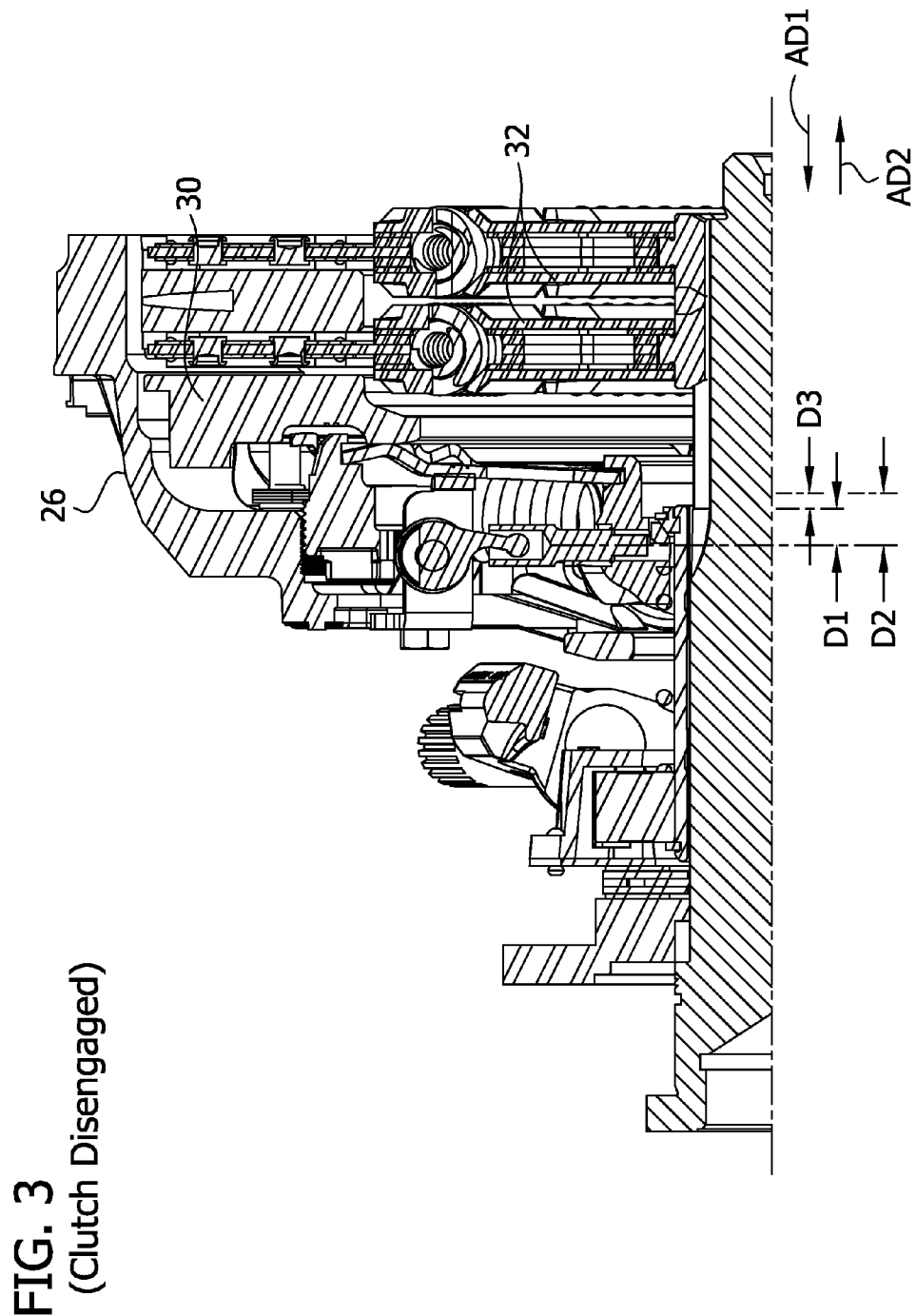
FIG. 3 is a cross-sectional view of the clutch of FIG. 1 showing the clutch in a disengaged position.

Referring to the drawings, FIGS. 1-3 illustrate a friction clutch, generally designated 20, incorporating a self-adjusting mechanism of the present invention, generally designated 22. In general, the clutch 20 comprises a cover 26 having a central axis 28, a pressure plate 30 movable along the axis relative to the cover to cause friction members 32 of the clutch to move into engagement, a clutch release mechanism 36 movable along the axis toward and away from the pressure plate, and an adjustment ring 40 having a threaded connection with the cover and rotatable to compensate for wear of the friction members. The clutch release mechanism 36 comprises a release sleeve 44 movable along the axis 28 of the clutch, and release levers 48 movable by the release sleeve. The levers 48 engage the pressure plate 30 at fulcrum locations 52. To disengage the clutch, the release mechanism 36 moves along axis 28 in a first axial direction AD1 (toward the left as viewed in FIGS. 2 and 3) against the urging of one or more coil springs 56. To engage the clutch, the release mechanism 36 moves along axis 28 under the urging of the coil springs 56 in a second axial direction AD2 toward the pressure plate 30 (toward the right as viewed in FIGS. 2 and 3).

Referring to FIGS. 4-9, the self-adjusting mechanism 22 comprises, in general, a mounting bracket 60 adapted to be secured to the cover 26, first and second rotatable hub members 62, 64 supported by the bracket for rotation about an axis of rotation 66 (FIG. 7), and mating ratchet teeth 62T, 64T on the first and second hub members configured such that the first hub member can rotate in a first rotational direction RD1 relative to the second hub member but can engage and drive the second hub member in a second rotational direction RD2 opposite the first rotational direction when the first hub member rotates in the second rotational direction. An adjustment arm 68 on the first hub member 62 is provided to affect rotation of the first hub member in the first and second rotational directions RD1, RD2 about the axis 66. The self-adjusting mechanism 22 also includes a worm gear 70 supported for rotation by the bracket 60, and an anti-slip device 72 configured to hold the worm gear against rotation in the first rotational direction RD1 but to allow rotation of the worm gear in the second rotational direction RD2.

The self-adjustment mechanism further comprises a lost-motion connection 78 between the worm gear 70 and the release mechanism 36 permitting a limited range of free play between the worm gear and the release mechanism as the release mechanism moves in the first axial direction AD1 toward the pressure plate and the second axial direction AD2 away from the pressure plate. In the illustrated embodiment, the lost motion connection 78 is located between the second hub member 64 and the worm gear 70 and permits a limited range of free rotational movement of the second hub member relative to the worm gear. The lost-motion connection 78 may be at other locations between the worm gear 70 and release mechanism 36, such as between the first and second hub members 62, 64 or between the adjustment arm 68 and the release mechanism, as will be described later. The various components of the self-adjusting mechanism 22 are described in more detail below.

Figure 4:
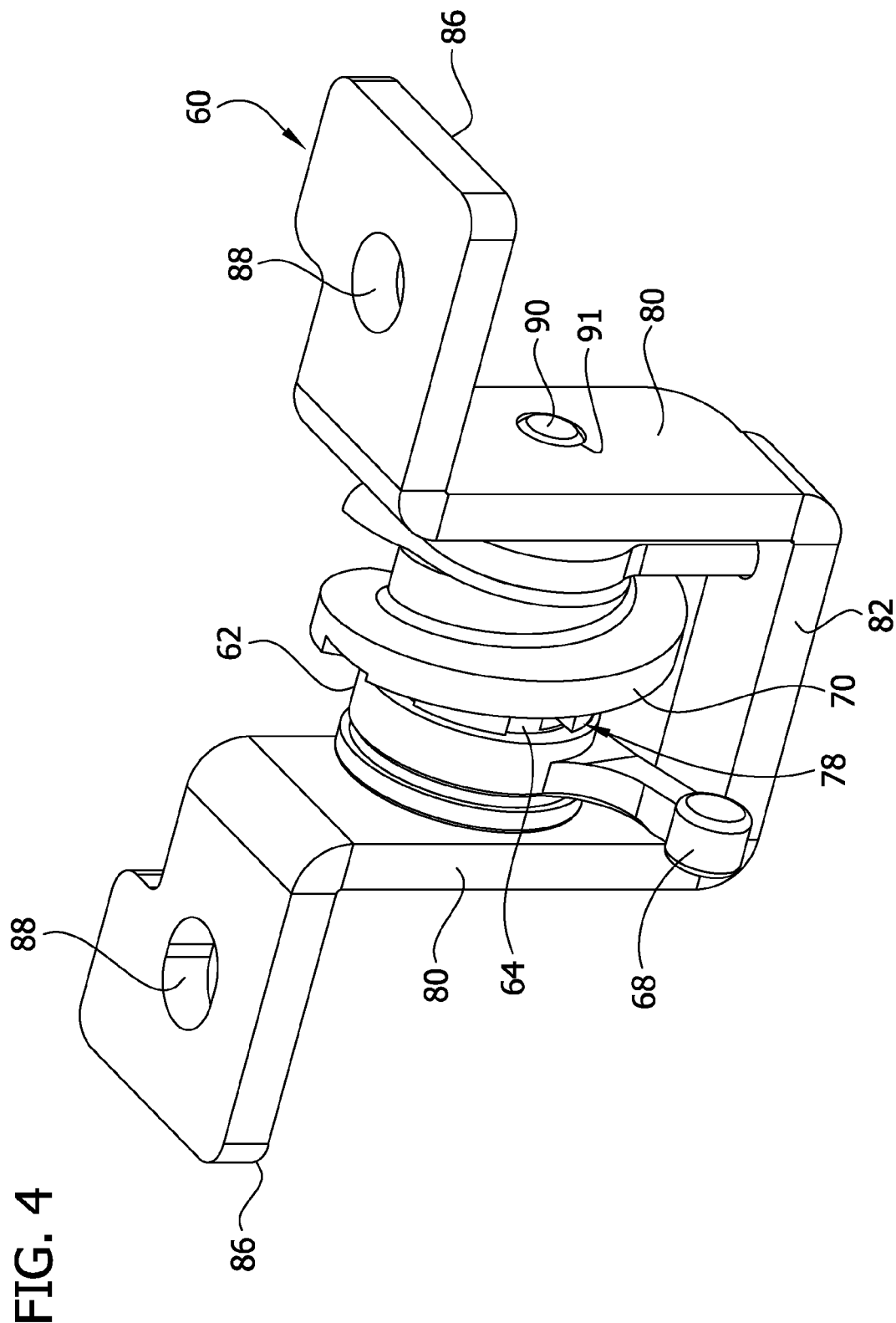
FIG. 4 is a perspective of the self-adjustment mechanism.
Figure 5:
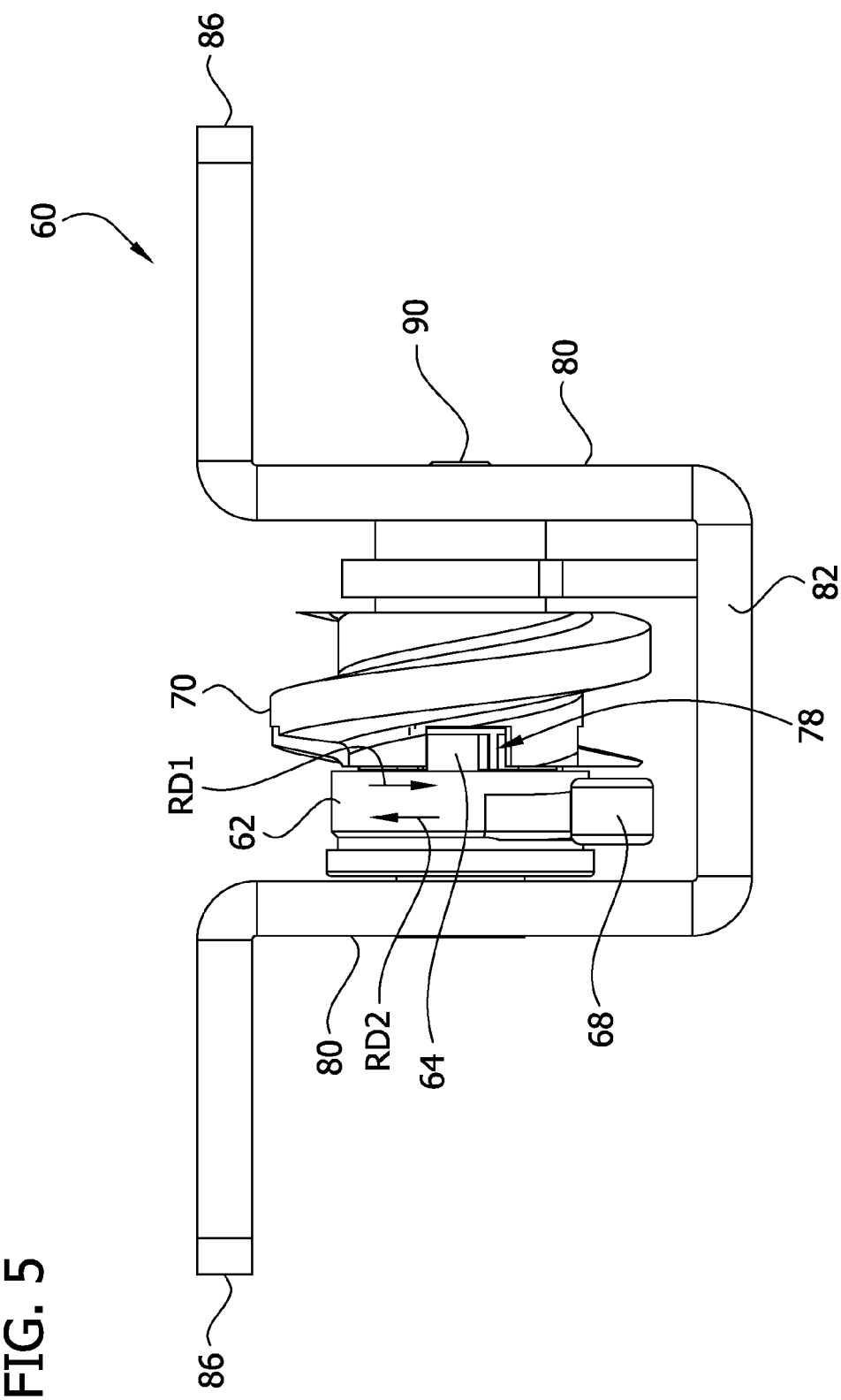
FIG. 5 is a front elevation of FIG. 4.
Figure 6:
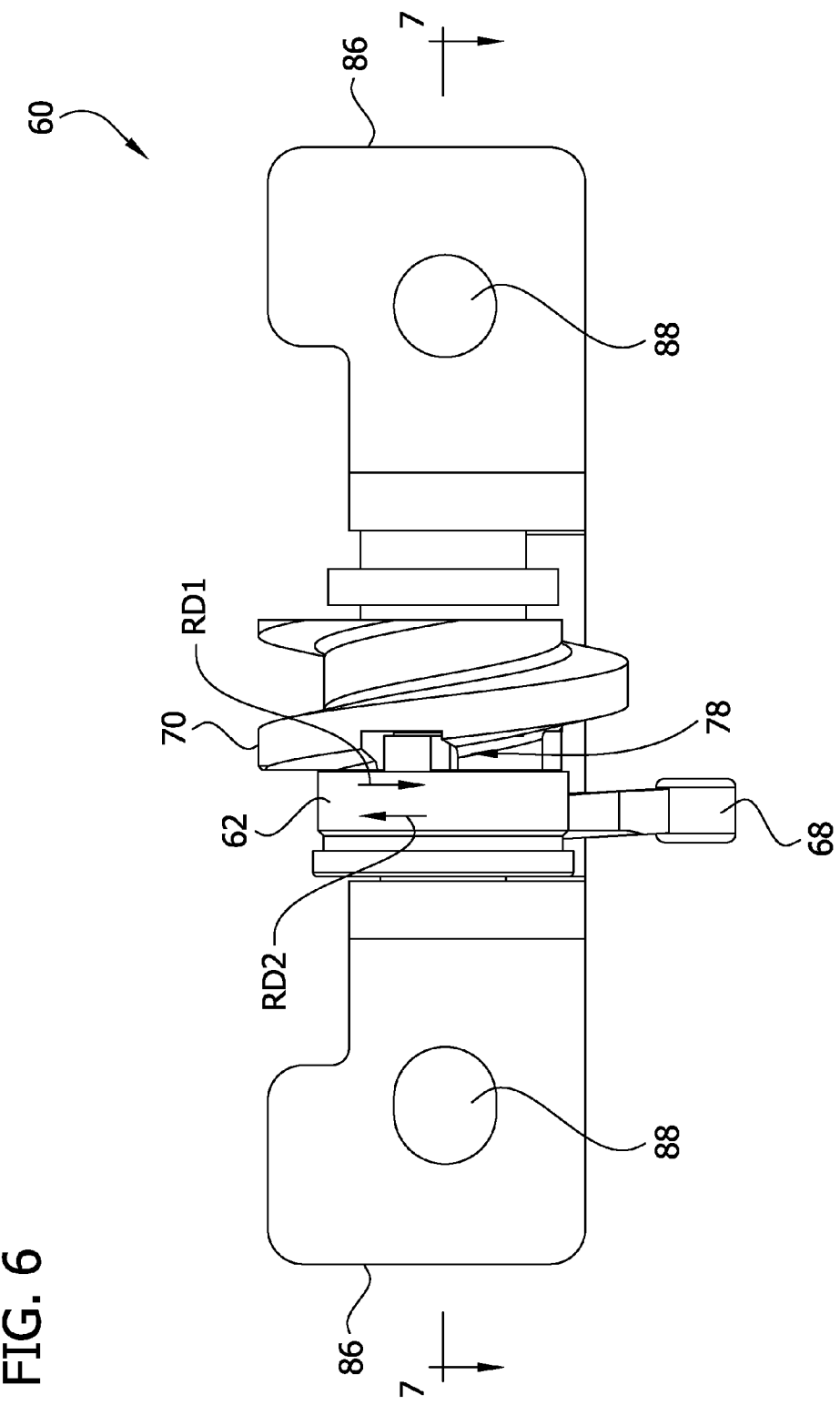
FIG. 6 is a top view of FIG. 4.

Referring to FIG. 4, the mounting bracket 60 is generally U-shaped, comprising a pair of spaced-apart legs 80, a connecting leg 82 connecting first ends of the legs 80, and flanges 86 extending laterally from second ends of the legs opposite their first ends. The flanges 86 have fastener holes 88 for fastening the bracket 60 to the cover 26 of the clutch. The mounting bracket 60 may have other configurations.

In the illustrated embodiment (see FIG. 8), the first and second hub members 62, 64 are mounted for rotation about the axis 66 on a pin or shaft 90 extending through openings 91 in the spaced apart legs 80 of the mounting bracket 60. The first hub member 62 is a generally cylindrical member having an internal annular surface formed with the ratchet teeth 62T. Desirably, the adjustment arm 68 and first hub member 62 have a non-slip connection such that rotational movement of the adjustment arm causes a corresponding rotational movement of the first hub member, without substantial rotational slippage (and preferably no rotational slippage) between the two parts 62, 68 even when there is substantial resistance to rotation of the first hub member. In one embodiment the adjustment arm 68 and first hub member 62 are integrally formed as a one-piece part, with the adjustment arm extending in a generally radial direction from the first hub member. Alternatively, the adjustment arm 68 and first hub member 62 can be formed as two parts rigidly secured together to prevent slippage between the two parts.

The second hub member 64 is a generally cylindrical member having an external annular surface formed with the ratchet teeth 64T. In this embodiment, the second hub member 64 is sized to fit inside the first hub member 62 in a position in which the ratchet teeth 62T, 64T mate with one another (see FIG. 7). The ratchet teeth on the first and second hub members 62, 64 have a saw-tooth configuration, e.g., a 45-degree saw-tooth configuration. Other configurations may be suitable. The number of teeth 62T, 64T on the hub members 62, 64 will vary depending on the desired frequency of adjustment provided by the self-adjustment mechanism 22. More specifically, the number of teeth on the hub members is inversely proportional to the extent of axial wear of the friction members 32 required to trigger an adjustment cycle of operation. Specifically, increasing the number of teeth will trigger an adjustment cycle in response to a smaller extent of axial wear, and decreasing the number of teeth will trigger an adjustment cycle in response to a larger extent of axial wear. In one preferred embodiment, the hub members 62, 64 have 48 teeth.

The worm gear 70 is also mounted on the shaft 90 for rotation about the axis of rotation 66. The worm gear 70 comprises a generally cylindrical member 92 having a cam surface 94 configured for engagement with the adjustment ring 40 such that rotation of the worm gear in the second rotational direction RD2 advances (rotates) the adjustment ring in the second axial direction AD2 toward the pressure plate 30 to compensate for axial wear of the frictional surfaces of the clutch. The cam surface 94 of the worm gear may have any suitable configuration, such as the spiral configuration illustrated in FIG. 8.

Figure 12A:
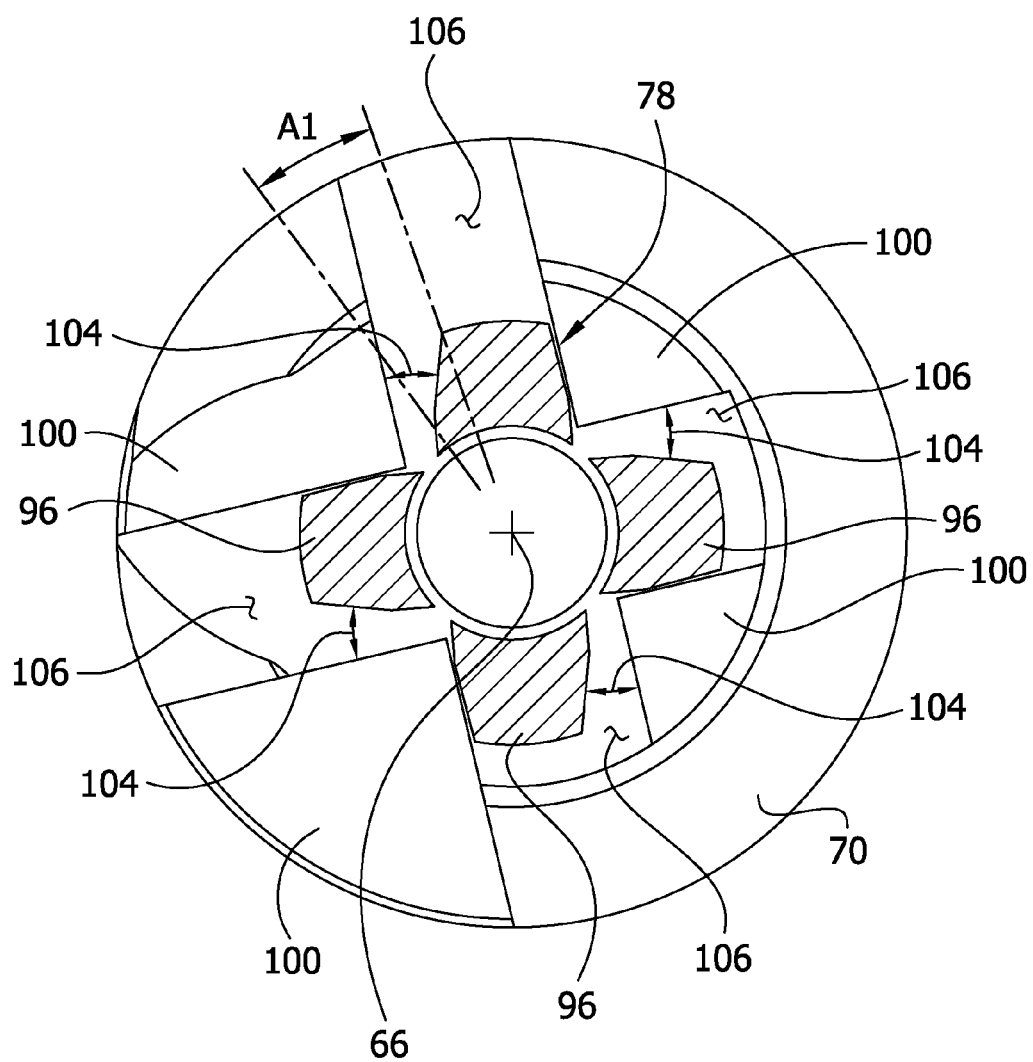
FIGS. 12A-12B are views similar to FIG. 11 but showing rotation of the second hub member relative to the worm gear via the lost-motion connection.
Figure 12B:
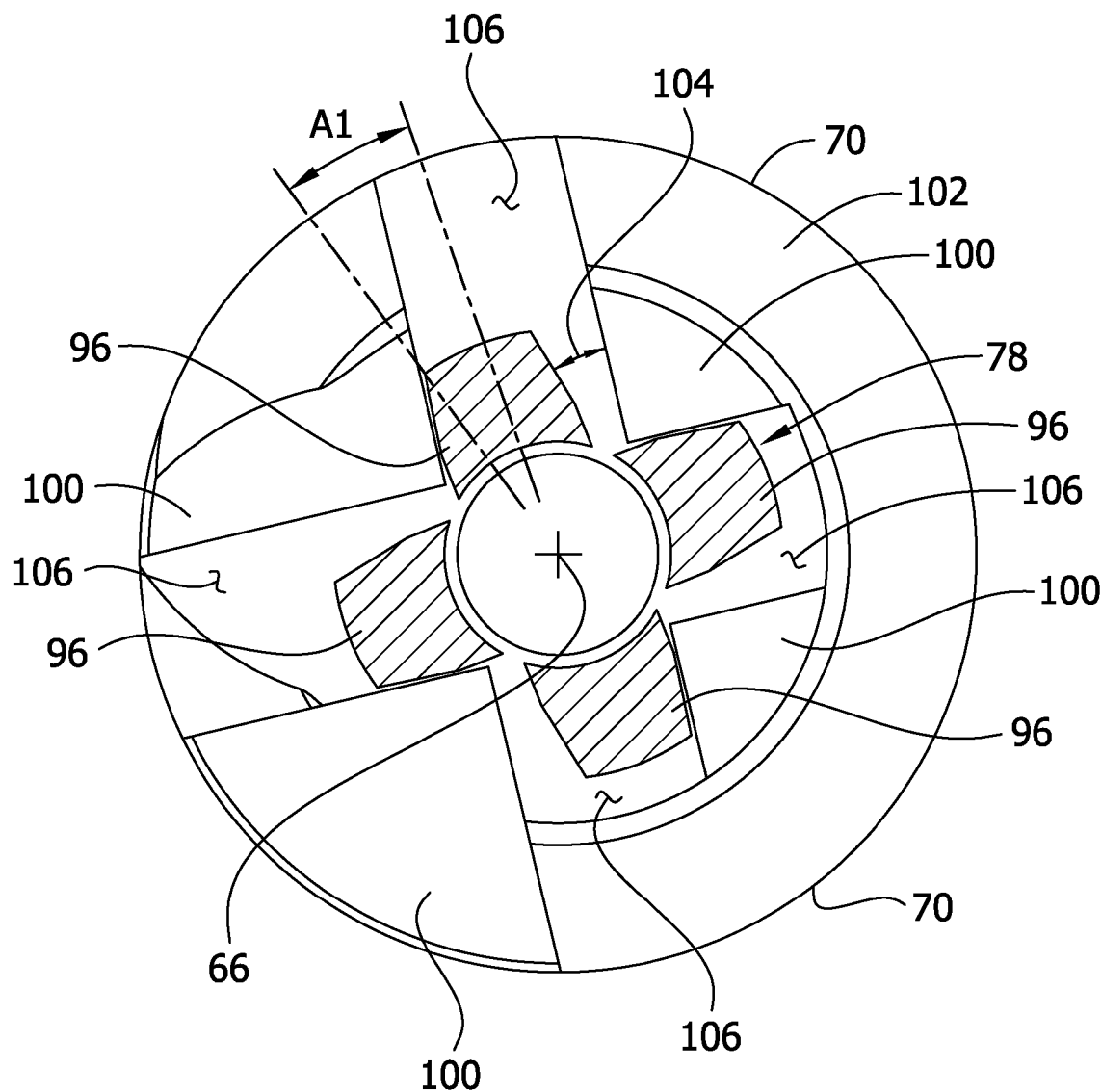

The lost-motion connection 78 between the second hub member 64 and the worm gear 70 comprises a first set of spaced-apart lugs 96 on an annular surface 98 at the side of the second hub member 64 facing the worm gear, and a second set of spaced-apart lugs 100 on an annular surface 102 at the side of the worm gear facing (opposing) the second hub member 64. The two sets of lugs 96, 100 are angularly spaced around respective annular surfaces 98, 102 and loosely mesh (interdigitate) with one another such that there is limited range of free rotational movement or free play of the second hub member 64 as it rotates in the stated first and second rotational directions RD1, RD2 relative to the worm gear 70. This range of free-play rotational movement is indicated at 104 in FIGS. 12A and 12B, which illustrate the lugs 96 on the second hub member 64 moving freely in the spaces 106 between the lugs 100 on the worm gear 70 as the second hub member rotates through an angle of rotation A1 without affecting movement of the worm gear 70. By way of example but not limitation, this limited range of free-play movement (i.e., angle of rotation A1) may approximate 25-35 degrees, e.g., 30 degrees, of angular rotation of the second hub member 64.

Figure 8:
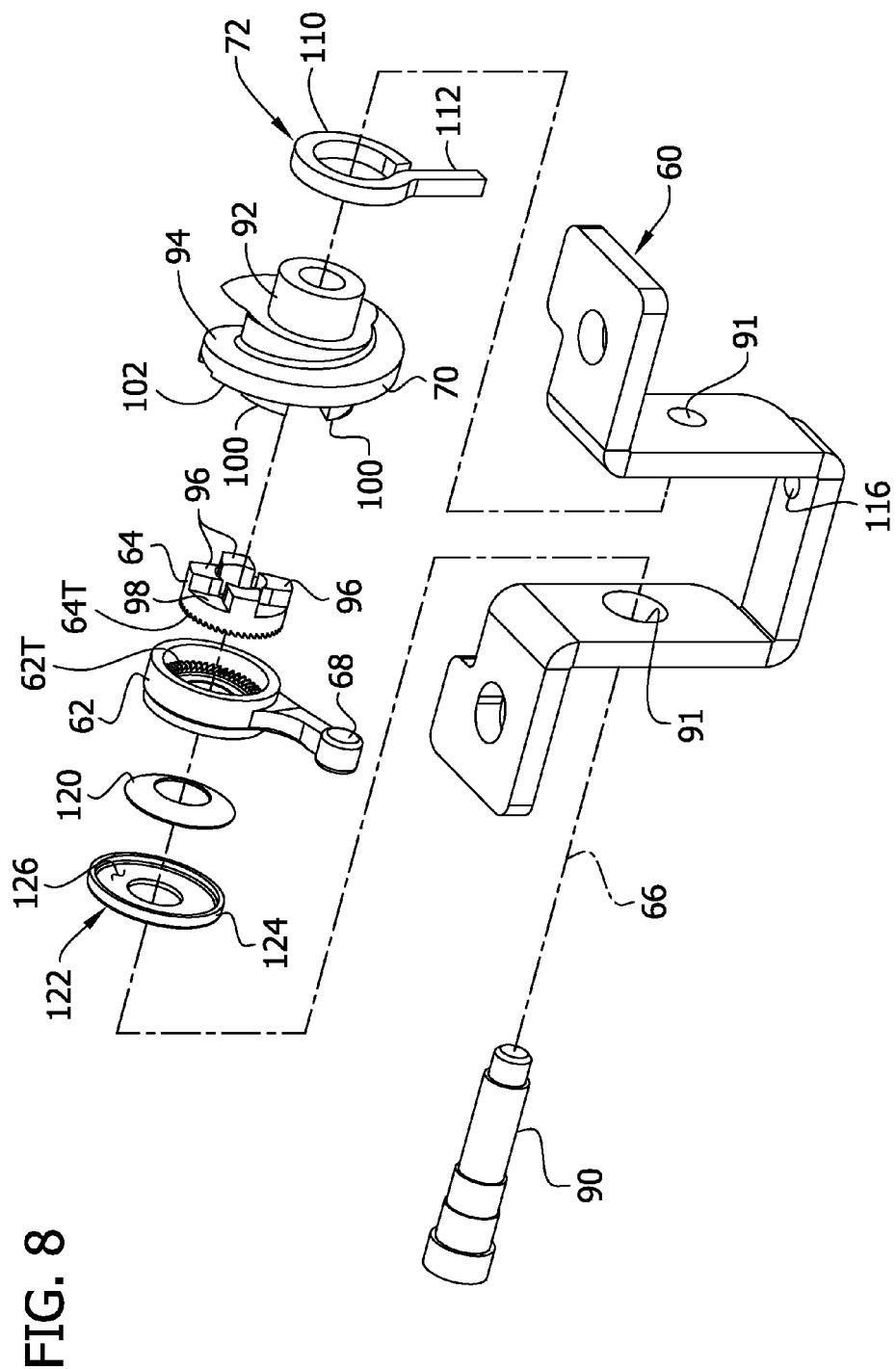
FIG. 8 is an exploded front perspective of the self-adjustment mechanism.
Figure 9:
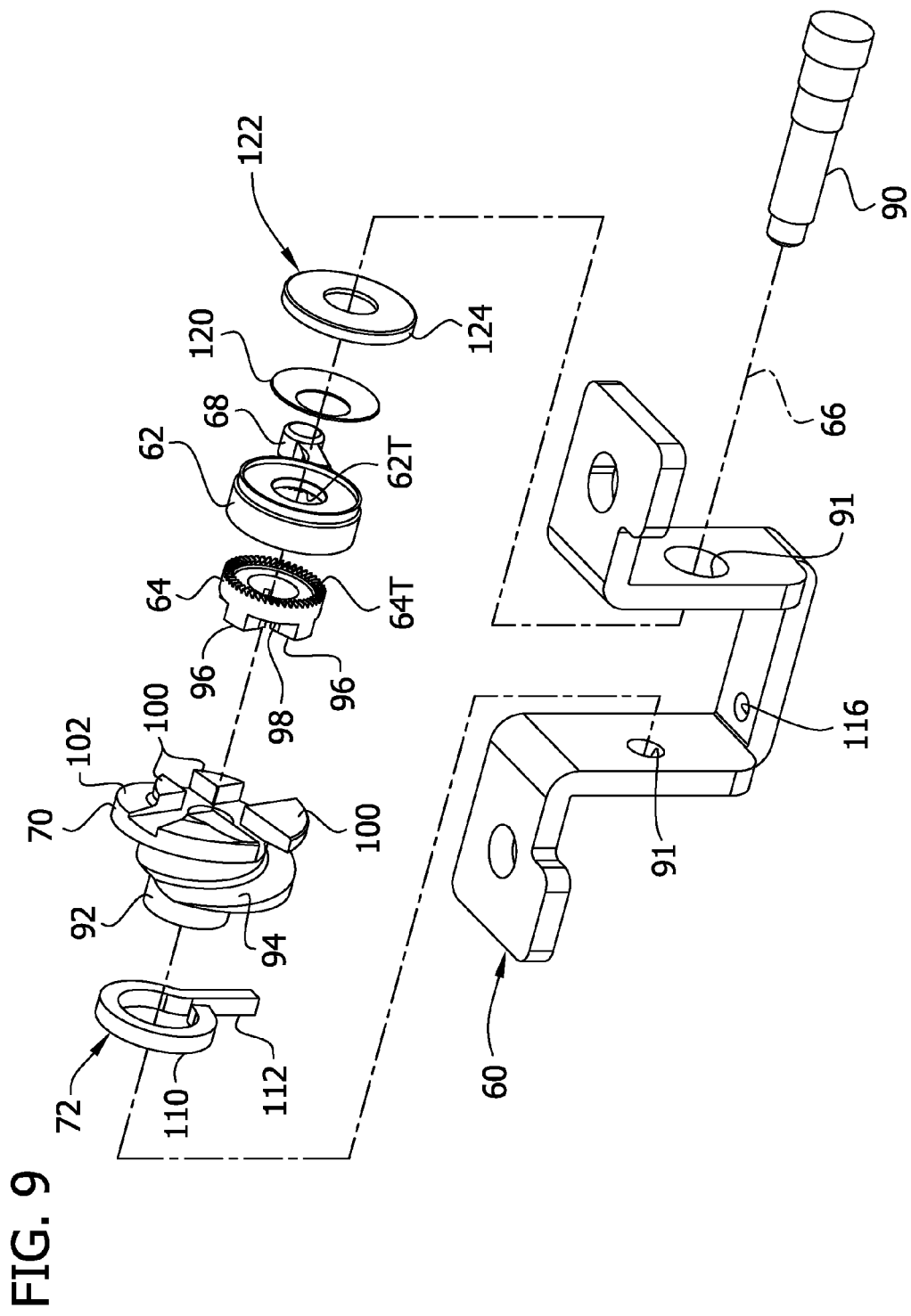
FIG. 9 is an exploded rear perspective of the self-adjustment mechanism.
Figure 10:
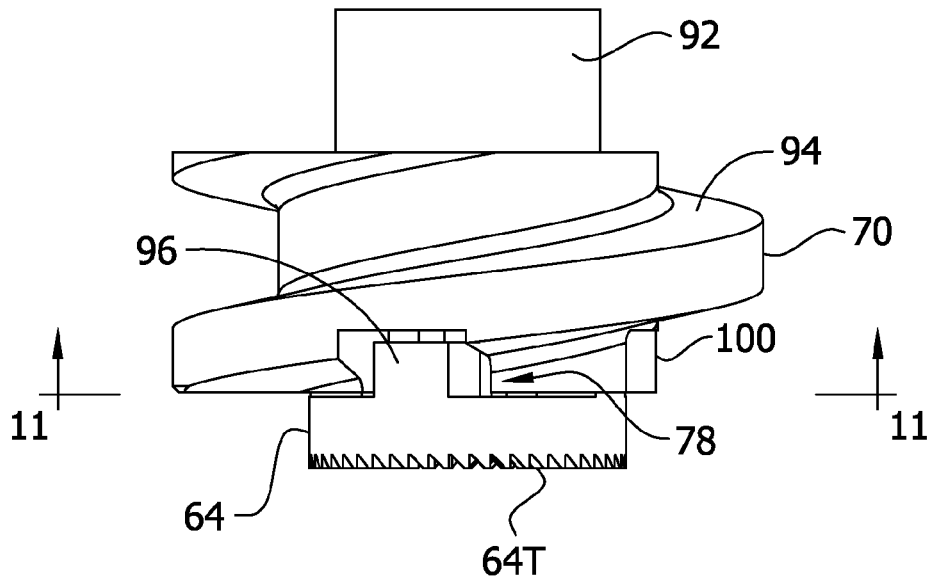
FIG. 10 is a view showing a lost-motion connection between lugs on the second hub member and the worm gear.
Figure 11:
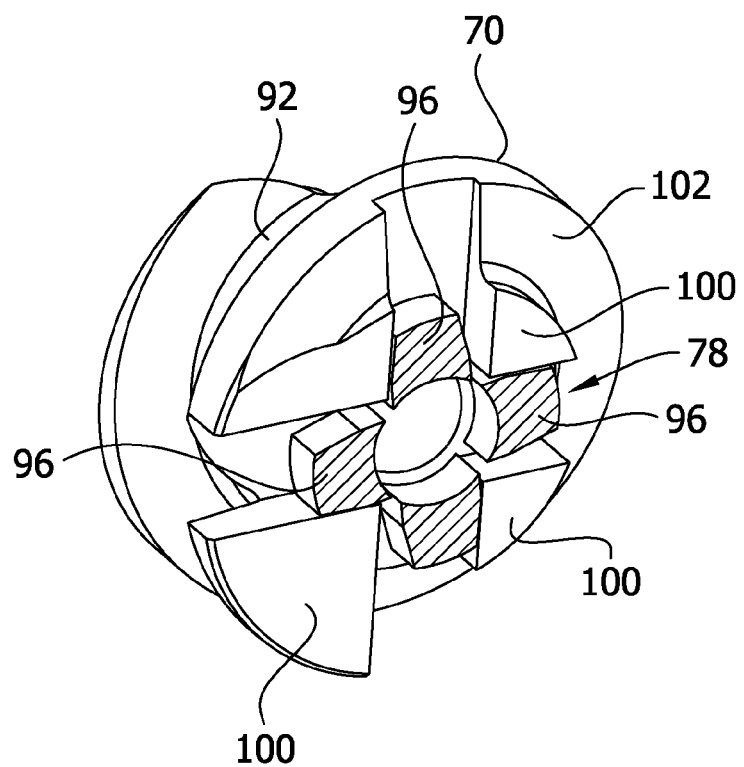
FIG. 11 is a perspective sectional view taken in the plane of 11-11 of FIG. 10.

Referring to FIG. 8, the anti-slip device 72 comprises a wire spring having a loop portion 110 encircling and gripping the cylindrical member 92 of the worm gear 70, and an arm portion 112 extending from the loop portion through an opening 116 in the connecting leg 82 of the mounting bracket 60. The anti-slip device 72 is configured to hold the worm gear 70 against rotation in the first rotational direction RD1 but to allow rotation of the worm gear in the second rotational direction RD2.

Figure 7:
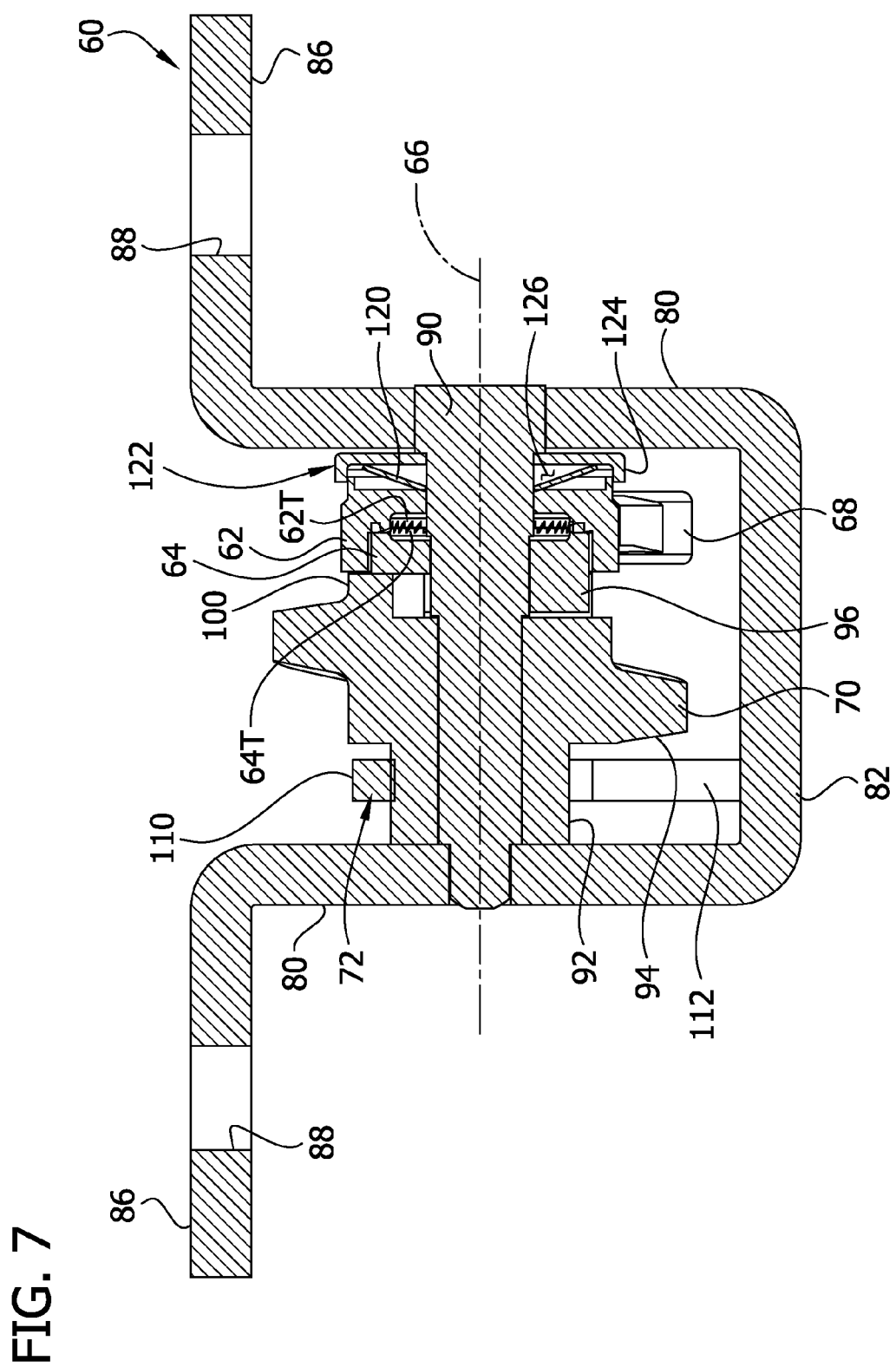
FIG. 7 is a section taken in the plane of 7-7 of FIG. 6.

As best illustrated in FIGS. 7 and 8, the self-adjustment mechanism 22 further comprises a spring device 120 and spring cover 122 positioned between a leg 80 of the mounting bracket 60 and the first hub member 62 for urging the mating ratchet teeth 62T, 64T of the two hub members 62, 64 into meshing engagement with one another, and for urging the two sets of lugs 96, 100 into meshing engagement with one another. In the illustrated embodiment, the spring device 120 comprises one or more annular disc springs seated on the shaft 90, but the spring device may have other configurations (e.g., one or more wave springs). The spring cover 122 comprises a cup-shaped member 124 mounted on the shaft 90 and defining a cavity 126 for receiving the spring device 120 and protecting it from dirt and grime that would otherwise build up on the spring.

Referring to FIG. 2, a connection 130 exists between the adjustment arm 68 and the clutch release mechanism 36 (release sleeve 44 and levers 48 engaging pressure plate 30) such that movement of the clutch release mechanism in the first axial direction AD1 causes movement of the adjustment arm in the first rotational direction RD1, and movement of the clutch release mechanism in the second axial direction AD2 opposite the first axial direction causes movement of the adjustment arm in the second rotational direction RD2. The connection 130 comprises a substantially rigid member 132 (e.g., a metal tube or hose) having a first end secured to the adjustment arm 68 and a second end secured to the release mechanism. In the illustrated embodiment (see FIGS. 1 and 2), the rigid member 132 comprises a tube having a first open end snugly receiving the adjustment arm 68 and a second end snugly received in an opening 134 in a boss 136 projecting from the release sleeve 44 of the release mechanism 36. The driving connection between the adjustment arm 68 and clutch release mechanism 36 may have other configurations, so long as movement of the release mechanism in both directions results in a corresponding movement of the adjustment arm, with little or no lost-motion between the adjustment arm and release mechanism.

The self-adjusting mechanism 22 will now be described as it moves through a "normal" (non-adjustment) cycle of operation during which there is no adjustment of the friction surfaces of the friction members 32 due to wear, and through an adjustment cycle of operation during which there is an axial adjustment of the friction surfaces of the friction members to compensate for friction wear.

Assuming the friction surfaces of the friction members 32 of the clutch have not worn to an extent requiring adjustment, a normal (non-adjustment) cycle of clutch operation is as follows.

Figure 13:
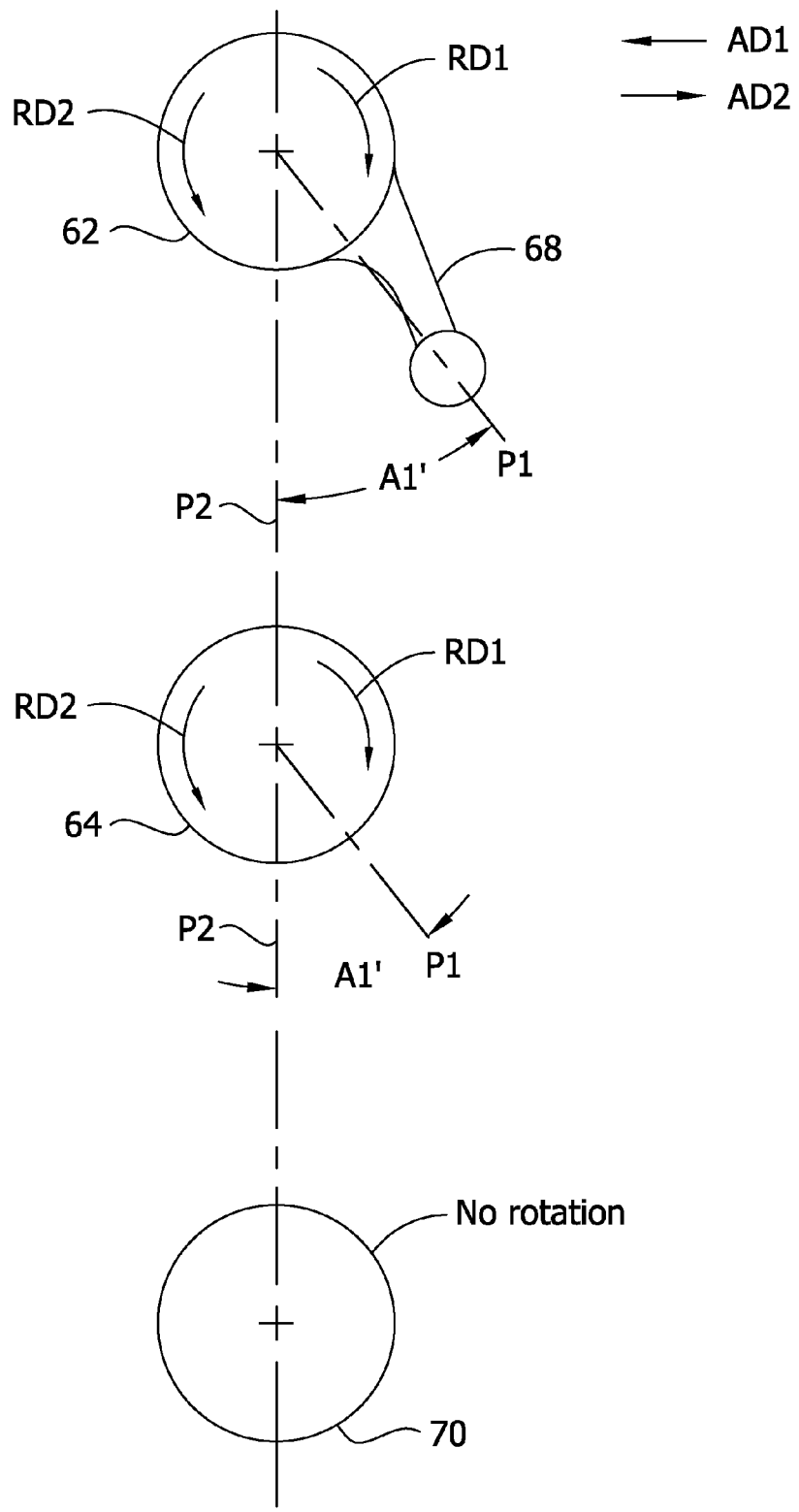
FIG. 13 is a schematic representation showing relative rotation between the first hub member, the second hub member, and the worm gear during a normal (non-adjustment) cycle of clutch operation.

When the clutch pedal is depressed to disengage the clutch, as illustrated in FIG. 3, the release mechanism 36 (release sleeve 44 and levers 48 engaging pressure plate 30) moves through a normal clutch-disengage stroke a first axial distance D1 in the stated first axial direction (toward the left as viewed in FIGS. 2 and 3) away from the pressure plate 30 of the clutch to disengage the friction surfaces of the friction members 32 of the clutch. The adjustment arm 68 is connected via the connection 130 to the release mechanism 36, such that movement of the release mechanism in the first axial direction AD1 causes the adjustment arm and first hub member 62 to rotate in the stated first rotational direction through a non-adjustment angle of rotation A1' from angular position P1 to angular position P2 (see FIG. 13). The spring device 120 exerts an axial force urging the ratchet teeth 62T of the first hub member 62 into mating engagement with ratchet teeth 64T on the second hub member 64 such that rotation of the first hub member through the angle of rotation A1' drives the second hub member in the same first rotational direction RD1 through the same angle of rotation A1' to angular position P2 (FIG. 13). Desirably, the non-adjustment angle of rotation A1' is equal to or slightly less (e.g., within one to five degrees) than the stated free-play angle A1 permitted by the lost-motion connection 78 between the second hub member 64 and the worm gear 70. As a result, rotation of the second hub member 64 in the first rotational direction RD1 through the angle of rotation A1' does not cause rotation of the worm gear (see FIG. 13). In other words, the amount of free-play 104 in the lost-motion connection 78 (FIGS. 12A and 12B) is sufficient to accommodate rotational movement of the second hub member 64 through the angle of rotation A1' without affecting any rotational movement of the worm gear 70. The anti-slip device 72 on the end of the worm gear 70 applies a constant anti-rotational force inhibiting rotation of the worm gear in both directions. During a "normal" cycle of clutch operation, this force prevents the worm gear 70 from turning.

When the clutch pedal is released to engage the clutch, the release mechanism 36 is moved by the coil clutch springs 56 through a clutch-engage stroke (toward the right as viewed in FIG. 3) the same axial distance D1 in the second axial direction AD2 toward the pressure plate 30 of the clutch to engage the friction surfaces of the friction members 32 of the clutch. Through the connection 130, the movement of the release mechanism 36 rotates the adjustment arm 68 in the second rotational direction RD2 (toward the pressure plate 30) back through the same non-adjustment angle of rotation A1' from angular position P2 to angular position P1 (see FIG. 13). The ratchet teeth 62T of the first hub member 62 remain mated with the ratchet teeth 64T of the second hub member 64 such that rotation of the first hub member back through angle A1' drives the second hub member 64 in the same second rotational direction RD2 back through the same angle of rotation A1'. The lost-motion connection 78 between the worm gear 70 and the second hub member 64 is such that rotation of the second hub member 64 in the second rotational direction RD2 back through the angle of A1' does not affect movement of the worm gear 70.

At the end of this "normal" cycle of operation, the worm gear has not rotated. As a result, the adjustment ring on the clutch has not been moved.

Assuming the friction surfaces of the friction members 32 of the clutch have worn to an extent requiring axial adjustment of the clutch release mechanism 36 to compensate for the wear, an "adjustment" cycle of clutch operation is as follows.

Figure 14:
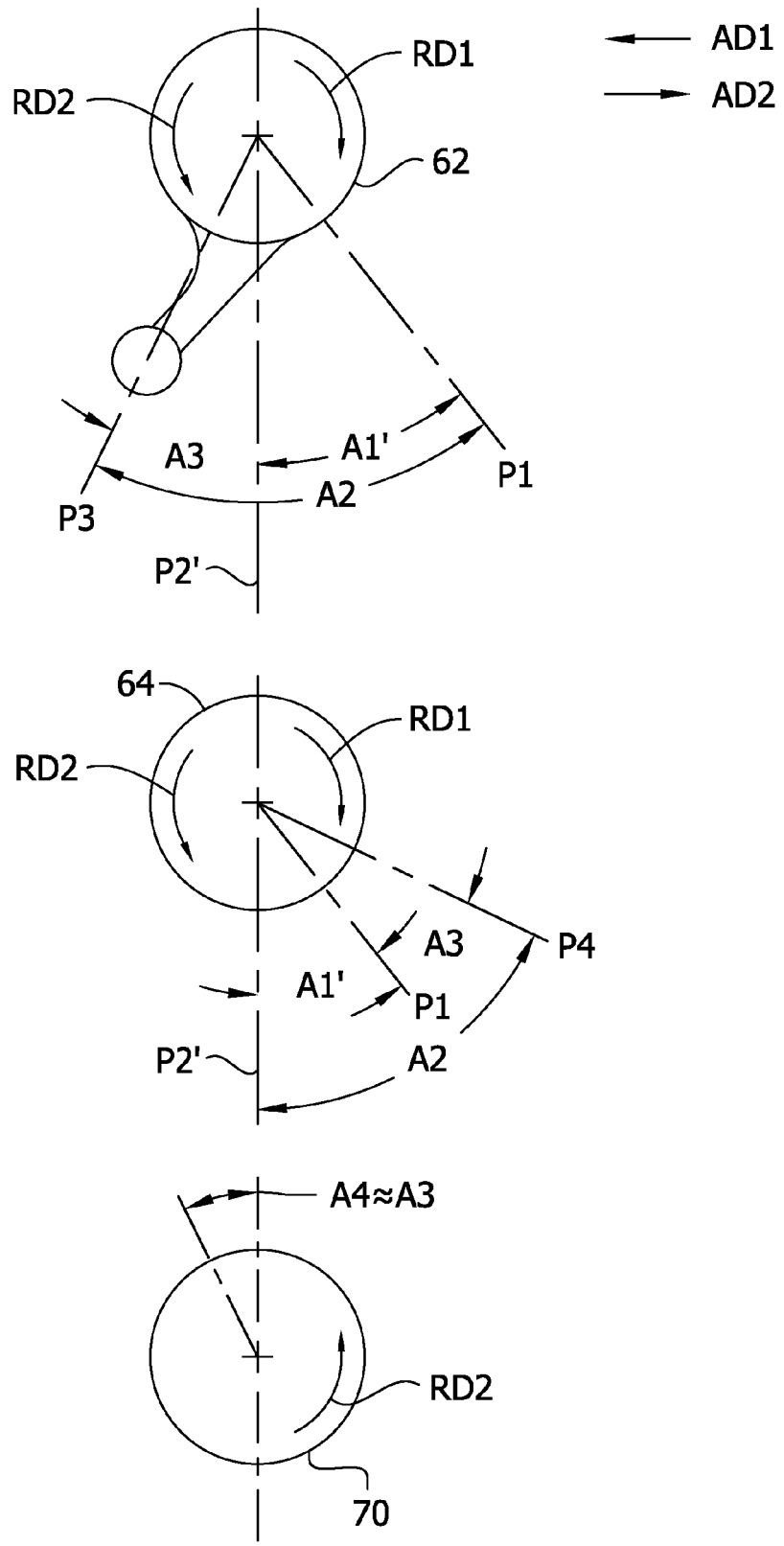
FIG. 14 is a schematic representation showing relative rotation between the first hub member, the second hub member, and the worm gear during an adjustment cycle of clutch operation.

When the clutch pedal is depressed to disengage the clutch, the clutch release mechanism 36 (release sleeve 44 and levers 48 engaging the pressure plate 30) moves in the first axial direction AD1 through a clutch-disengage stroke a second axial distance D2 away from the pressure plate 30 of the clutch to disengage the friction surfaces of the friction members 32 of the clutch. Due to wear of the friction surfaces, the distance D2 is greater than distance D1 by some delta distance D3 (see FIGS. 2 and 3). Because of this delta distance D3, the adjustment arm 68 and first hub member 62 are driven via the connection 130 in the first rotational direction RD1 through an adjustment angle of rotation A2 (see FIG. 14) from position P1 to position P3. The adjustment angle of rotation A2 is greater than the non-adjustment angle A1' by a delta angle of rotation A3 (see FIG. 14). As the first hub member 62 rotates in the first rotational direction RD1 through the angle of rotation A2, the second hub member 64 rotates only through angle A1 from position P1 to position P2' until the free-play in the lost most connection 78 between the second hub member 64 and the worm gear 70 is taken up, at which time the anti-slip device 72 prevents further rotation of the second hub member 64 and the worm gear, even as the first hub member 62 continues to rotate through the delta angle of rotation A3. The anti-rotational force exerted by the anti-slip device 72 is sufficient to cause the teeth 62T on the first hub member 62 to separate from the teeth 64T on the second hub member 64 against the urging of the spring device 120, which allows the first hub member 62 to rotate in the first rotational direction RD1 relative to the second hub member 64 through the delta angular interval A3, which is equal to at least one tooth interval. When the first hub member 62 has completed its movement through angular interval A3, the teeth 62T, 64T move back into mesh under the urging of the spring device 120.

The teeth 62T, 64T on the first hub member 62 and second hub member 64 have a saw-tooth configuration such that a rotational force exerted on the first hub member in the first rotational direction generates a frictional force between the teeth that includes a rotational component perpendicular to axis 28 and an axial component parallel to axis 28. The teeth are able to separate when the axial component is sufficient to overcome the axial force exerted by the spring device 120 in the opposite direction. The mating teeth 62T, 64T are ratchet teeth, so that the teeth cannot separate when the first hub member 62 is rotated in the second rotational direction during the clutch-engage stroke, described below.

When the clutch pedal is released to engage the clutch, the release mechanism 36 is moved in the second axial direction AD2 through a clutch-engage stroke the same axial distance D2 toward the pressure plate 30 of the clutch (toward the right in FIG. 3) to engage the friction surfaces of the friction members 32 of the clutch. Through the connection 130, the movement of the release mechanism 36 rotates the adjustment arm 68 and first hub member 62 in the second rotational direction RD2 back through the same adjustment angle of rotation A2 from position P3 to position P1. The ratchet teeth 62T of the first hub member 62 remain mated with the ratchet teeth 64T on the second hub member 64 such that rotation of the first hub member back through adjustment angle of rotation A2 drives the second hub member 64 in the same second rotational direction RD2 back through the same angle of rotation A2 from angular position P2' to angular position P4 (see FIG. 14). The lost-motion connection 78 between the worm gear 70 and the second hub member 64 is such that rotation of the second hub member 64 in the second rotational direction RD2 back through the adjustment angle of rotation A2 effects an incremental rotation of the worm gear in the second rotational direction RD2, as permitted by slippage of the anti-slip device 72, through an angle of rotation A4 approximating the delta angle of rotation A3 (see FIG. 14), which is typically an angle equal to one tooth interval. This incremental rotation of the worm gear 70 through the angle of rotation A4 effects rotation of the adjustment ring 40 to compensate for the wear of the friction surfaces of the friction members 32 of the clutch.

After completion of an adjustment cycle, normal cycles of operation continue, each accompanied by a "normal" operation stroke length substantial equal to distance D2, until such time as the friction surfaces wear to an extent allowing the ratchet teeth 62T, 64T to separate and the first hub member 62 to rotate an additional tooth relative to the second hub member 64.

By way of example but not limitation, the angles of rotation A1, A2, A3, and A4 may have the following values: A1=25-35 degrees, e.g., about 30 degrees; A2=33-42 degrees, e.g., about 38 degrees; A3=5-10 degrees, e.g., about 7.5 degrees, for a hub member 62, 64 having 48 teeth; and A4=5-10 degrees, e.g., about 7.5 degrees, for a hub member 62, 64 having 48 teeth (A3 and A4 will vary depending on the number of teeth on the hub members 62, 64). In one embodiment, the limited range of free-play rotational movement A1 allowed by the lost-motion connection 78 approximates the angle of rotation A1'.

In the self-adjustment mechanism 22 described above, the lost-motion connection 78 is located between the worm gear 70 and the second hub member 64. In a second embodiment of the self-adjustment mechanism (not shown), the worm gear and second hub member are connected for unitary rotation, that is, there is no lost rotational motion or free play between the worm gear and the second hub member. Instead, the lost-motion connection is located between the adjustment arm 68 and the release mechanism 36. By way of example, the lost-motion connection may comprise a loose fit of the adjustment arm 68 in the open end of the rigid member 132 to allow a limited range of free play between these components before axial movement of the release mechanism causes rotational movement of the adjustment arm. The lost-motion connection is such that, during a non-adjustment cycle, the movement of the release mechanism 36 is within the range of free play between the adjustment arm 68 and the rigid member 132 so that the worm gear 70 is not rotated. However, during an adjustment cycle, the release mechanism moves a distance which is more than sufficient to take up the free play between the release mechanism and the adjustment arm and sufficient to cause rotation of the first hub member relative to the second hub member in the stated first rotational direction, as in the first embodiment. As a result, the worm gear 70 is caused to rotate to affect an axial adjustment of the friction members 32. In all other respects, operation and construction of the second embodiment of the self-adjustment mechanism is the same as the first embodiment 22.

Figure 15:
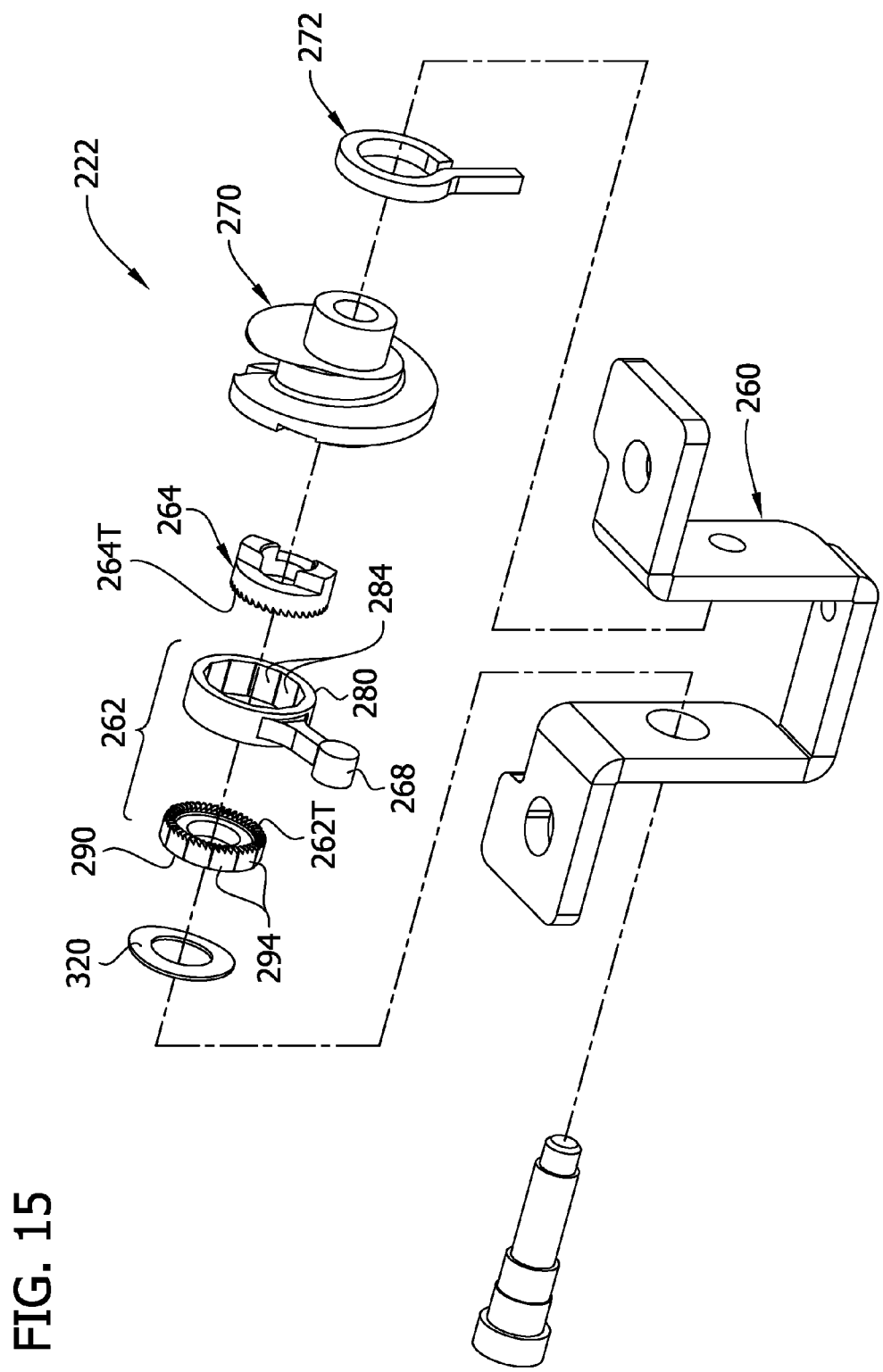
FIG. 15 is an exploded perspective view showing components of an alternative embodiment of a self-adjusting mechanism of the present invention.

FIG. 15 illustrates a third embodiment of a self-adjustment mechanism of this invention, generally designated 222. The mechanism 222 is similar to the mechanism 22 described above. It comprises a mounting bracket 260, first and second rotatable hub members 262, 264 supported by the bracket, and mating ratchet teeth 262T, 264T on the first and second hub members configured such that the first hub member can rotate in a first rotational direction relative to the second hub member but can engage and drive the second hub member in a second rotational direction opposite the first rotational direction when the first hub member rotates in the second rotational direction. An adjustment arm 268 on the first hub member 262 is provided to affect rotation of the first hub member in the first and second rotational directions. The self-adjusting mechanism 222 also includes a worm gear 270 supported for rotation by the bracket 260, and an anti-slip device 272 configured to hold the worm gear against rotation in the first rotational direction but to allow rotation of the worm gear in the second rotational direction.

The first hub member 262 comprises a first generally cylindrical hub part 280 having an interior surface formed with a series of flats 284. The adjustment arm 268 has a non-slip connection with the cylindrical hub part 280. In this embodiment, the adjustment arm 268 is integral with the first hub part 280. The first hub member 262 also comprises a second generally cylindrical hub part 290 which fits inside the first hub part 280. The second hub part has an exterior surface formed with a series of flats 294. The flats 284, 294 on the two hub parts 280, 290 are configured for engagement with one another and provide a lost-motion connection allowing a limited range of rotational free play between the two hub parts. Thus, in this embodiment, the lost-motion connection between the worm gear 270 and the release mechanism 36 of the clutch is located between component parts of the first hub member 262. The second hub member 264 and worm gear 270 are connected for rotation in unison with one another without any substantial lost-motion rotational movement therebetween.

The adjustment mechanism also includes a spring device 320 positioned between a leg of the mounting bracket 260 and the second hub part 290 of hub member 262 for urging the mating ratchet teeth 262T, 264T of the two hub members 262, 264 into meshing engagement with one another.

In all other respects, operation and construction of the self-adjustment mechanism 222 is the same as the first embodiment 22.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawing[s] shall be interpreted as illustrative and not in a limiting sense.

What is claimed is:

1. A self-adjusting mechanism for a friction clutch having a cover, a pressure plate movable relative to the cover to cause friction members of the clutch to move into engagement, a clutch release mechanism movable toward and away from the pressure plate, and an adjustment ring rotatable to compensate for wear of the friction members, the self-adjusting mechanism comprising:
   a mounting bracket adapted to be secured to the cover;
   first and second rotatable hub members supported for rotation by the bracket;
   mating ratchet teeth on the first and second hub members configured such that the first hub member can rotate in a first rotational direction relative to the second hub member but can engage and drive the second hub member in a second rotational direction opposite the first rotational direction when the first hub member rotates in the second rotational direction;
   an adjustment arm having a non-slip connection with the first hub member for affecting rotation of the first hub member in first and second rotational directions without substantial rotational slippage of the adjustment arm relative to the first hub member;
   a worm gear supported for rotation by the bracket;
   an anti-slip device configured to hold the worm gear against rotation in the first rotational direction but to allow rotation of the worm gear in the second rotational direction;
   a lost-motion connection located between the worm gear and the release mechanism permitting a limited range of free play between the worm gear and the release mechanism as the release mechanism moves in a first axial direction toward the pressure plate and in a second axial direction away from the pressure plate, said lost-motion connection comprising loosely meshing lugs on the worm gear and the second hub member, the lugs on the second hub member being tapered to provide flat contact with the lugs on the worm gear;
   wherein said clutch release mechanism is movable through an adjustment cycle in which the release mechanism moves in said first axial direction and drives the adjustment arm to rotate the first hub member in said first rotational direction through an adjustment angle of rotation sufficient to cause separation of said mating teeth to permit movement of the first hub member relative to the second hub member, and wherein the release mechanism then moves in said second axial direction and drives the adjustment arm to rotate the first and second hub members in said second rotational direction back through said adjustment angle of rotation, said lost-motion connection being configured such that rotation of the second hub member back through said adjustment angle of rotation causes rotation of the worm gear to affect rotation of the adjustment ring to compensate for wear of the friction members;
   a spring device urging the ratchet teeth on the first and second hubs into mating engagement;
   a spring cover defining a cavity for receiving the spring device; and
   wherein the mating ratchet teeth are contained inside one of the hub members.

2. A self-adjusting mechanism as set forth in claim 1, further comprising a substantially rigid connection between the release mechanism and the adjustment arm such that movement of the release mechanism causes a corresponding movement of the adjustment arm without any substantial lost motion therebetween.

3. A self-adjusting mechanism as set forth in claim 2, wherein the substantially rigid connection comprises a substantially rigid member having a first end secured to one end of the adjustment arm and a second end secured to a component of the release mechanism.

4. A self-adjusting mechanism as set forth in claim 1, wherein said clutch release mechanism is movable through a non-adjustment cycle in which the release mechanism moves in said first axial direction and drives the adjustment arm to rotate the first and second hub members in said first rotational direction through a non-adjustment angle of rotation less than said adjustment angle of rotation without rotating the worm gear, and wherein the release mechanism then moves in said second axial direction and drives the adjustment arm to rotate the first and second hub members in said second rotational direction back through the non-adjustment angle of rotation without rotating the worm gear; and
  wherein said clutch release mechanism is movable through said adjustment cycle wherein the release mechanism moves in said first axial direction and drives the adjustment arm to rotate the first hub member in said first rotational direction through said adjustment angle of rotation greater than the non-adjustment angle of rotation by a delta angle of rotation, said mating teeth separating during said delta angle of rotation to permit movement of the first hub member relative to the second hub member, and wherein the release mechanism then moves in said second axial direction and drives the adjustment arm to rotate the first and second hub members in said second rotational direction back through said adjustment angle of rotation, said lost-motion connection being configured such that rotation of the second hub member back through said adjustment angle of rotation causes rotation of the worm gear to affect rotation of the adjustment ring to compensate for wear of the friction members.

5. A self-adjusting mechanism as set forth in claim 1, wherein said adjustment arm is integral with the first hub member.

6. A self-adjusting mechanism as set forth in claim 1, wherein said spring device and spring cover are mounted on a shaft extending between spaced-apart legs of the mounting bracket.

7. A self-adjusting mechanism for a friction clutch having a cover, a pressure plate movable relative to the cover to cause friction members of the clutch to move into engagement, a clutch release mechanism movable toward and away from the pressure plate, and an adjustment ring rotatable to compensate for wear of the friction members, the self-adjusting mechanism comprising:
  a mounting bracket adapted to be secured to the cover;
  first and second rotatable hub members supported for rotation by the bracket;
  mating ratchet teeth on the first and second hub members configured such that the first hub member can rotate in a first rotational direction relative to the second hub member when the ratchet teeth are separated but can engage and drive the second hub member in a second rotational direction opposite the first rotational direction when the ratchet teeth are engaged and the first hub member rotates in the second rotational direction, said mating ratchet teeth being contained inside one of the hub members when the ratchet teeth are engaged and when the ratchet teeth are separated;
  an adjustment arm on the first hub member for affecting rotation of the first hub member in first and second rotational directions;
  a worm gear supported for rotation by the bracket;
  an anti-slip device configured to hold the worm gear against rotation in the first rotational direction but to allow rotation of the worm gear in the second rotational direction;
  the second hub member and the worm gear having a lost-motion connection permitting a limited range of rotational free play of the second hub member relative to the worm gear; and
  a connection between the adjustment arm and the clutch release mechanism such that movement of the clutch release mechanism in a first axial direction causes movement of the adjustment arm in the first rotational direction, and movement of the clutch release mechanism in a second axial direction opposite the first axial direction causes movement of the adjustment arm in the second rotational direction;
  wherein said clutch release mechanism is movable through a non-adjustment cycle wherein the release mechanism moves in said first axial direction and drives the adjustment arm to rotate the first and second hub members in said first rotational direction through a non-adjustment angle of rotation without rotating the worm gear, and wherein the release mechanism then moves in said second axial direction and drives the adjustment arm to rotate the first and second hub members in said second rotational direction back through the non-adjustment angle of rotation without rotating the worm gear; and
  wherein said clutch release mechanism is movable through an adjustment cycle wherein the release mechanism moves in said first axial direction and drives the adjustment arm to rotate the first hub member in said first rotational direction through an adjustment angle of rotation greater than the non-adjustment angle of rotation by a delta angle of rotation, said mating teeth separating during said delta angle of rotation to permit movement of the first hub member relative to the second hub member, and wherein the release mechanism then moves in said second axial direction and drives the adjustment arm to rotate the first and second hub members in said second rotational direction back through said adjustment angle of rotation, said lost-motion connection being configured such that rotation of the second hub member back through said adjustment angle of rotation causes rotation of the worm gear to affect rotation of the adjustment ring to compensate for wear of the friction members.

8. A self-adjusting mechanism as set forth in claim 7, further comprising a spring device urging the ratchet teeth on the first and second hubs into mating engagement.

9. A self-adjusting mechanism as set forth in claim 8, further comprising a spring cover defining a cavity for receiving the spring device.

10. A self-adjusting mechanism as set forth in claim 9, wherein said spring device and spring cover are mounted on a shaft extending between spaced-apart legs of the mounting bracket.

11. A self-adjusting mechanism as set forth in claim 7, further comprising a substantially rigid member connecting the release mechanism and the adjustment arm.

12. A self-adjusting mechanism as set forth in claim 11, wherein the substantially rigid member has a first end secured to one end of the adjustment arm and a second end secured to a component of the release mechanism.

13. A self-adjusting mechanism as set forth in claim 1, wherein the second hub member fits inside the first hub member.

14. A self-adjusting mechanism as set forth in claim 1, wherein said lost-motion connection comprises multiple lugs on the worm gear and multiple lugs on the second hub member.

15. A self-adjusting mechanism as set forth in claim 7, wherein the second hub member fits inside the first hub member.

16. A self-adjusting mechanism as set forth in claim 15, wherein the second hub member has an external circular rim extending from the ratchet teeth on the second hub member to a lug on the second hub member adapted for driving engagement with a lug on the worm gear, and wherein the first hub member has an internal circular surface extending from the ratchet teeth on the first hub member and defining a cavity receiving the external circular rim of the second hub member when the mating ratchet teeth are engaged and when the mating ratchet teeth are separated.

17. A self-adjusting mechanism for a friction clutch having a cover, a pressure plate movable relative to the cover to cause friction members of the clutch to move into engagement, a clutch release mechanism movable toward and away from the pressure plate, and an adjustment ring rotatable to compensate for wear of the friction members, the self-adjusting mechanism comprising:

a mounting bracket adapted to be secured to the cover;

first and second rotatable hub members supported for rotation by the bracket;

mating ratchet teeth on the first and second hub members configured such that the first hub member can rotate in a first rotational direction relative to the second hub member but can engage and drive the second hub member in a second rotational direction opposite the first rotational direction when the first hub member rotates in the second rotational direction;

an adjustment arm having a non-slip connection with the first hub member for affecting rotation of the first hub member in first and second rotational directions without substantial rotational slippage of the adjustment arm relative to the first hub member;

a worm gear supported for rotation by the bracket;

an anti-slip device configured to hold the worm gear against rotation in the first rotational direction but to allow rotation of the worm gear in the second rotational direction; and a lost-motion connection located between the worm gear and the release mechanism permitting a limited range of free play between the worm gear and the release mechanism as the release mechanism moves in a first axial direction toward the pressure plate and in a second axial direction away from the pressure plate;

wherein said clutch release mechanism is movable through an adjustment cycle in which the release mechanism moves in said first axial direction and drives the adjustment arm to rotate the first hub member in said first rotational direction through an adjustment angle of rotation sufficient to cause separation of said mating teeth to permit movement of the first hub member relative to the second hub member, and wherein the release mechanism then moves in said second axial direction and drives the adjustment arm to rotate the first and second hub members in said second rotational direction back through said adjustment angle of rotation, said lost-motion connection being configured such that rotation of the second hub member back through said adjustment angle of rotation causes rotation of the worm gear to affect rotation of the adjustment ring to compensate for wear of the friction members;

a spring device urging the ratchet teeth on the first and second hubs into mating engagement; and wherein the mating ratchet teeth are contained inside one of the hub members.

\* \* \* \* \*